United States Patent [19]

Saito

[11] 4,369,755

[45] Jan. 25, 1983

[54] AIR CONTROL DEVICE

[75] Inventor: Masaaki Saito, Yokosuka, Japan

[73] Assignee: Nissan Motor Co., Ltd., Yokohama, Japan

[21] Appl. No.: 178,238

[22] Filed: Aug. 13, 1980

[30] Foreign Application Priority Data

Aug. 23, 1979 [JP] Japan .................. 54-116165[U]

[51] Int. Cl.³ .............................................. F02M 7/24
[52] U.S. Cl. ................................................... 123/588
[58] Field of Search ............... 123/585, 588, 586, 587, 123/589; 261/39 R, 39 B, DIG. 74; 137/480

[56] References Cited

U.S. PATENT DOCUMENTS

| 1,656,356 | 1/1928 | Johasz | 123/585 X |
| 3,958,544 | 5/1976 | Shinoda et al. | 123/586 |
| 3,964,457 | 6/1976 | Coscia | 123/585 |
| 4,164,914 | 8/1979 | Hattori et al. | 123/588 X |
| 4,197,823 | 4/1980 | Schwartz et al. | 123/588 X |

Primary Examiner—William A. Cuchlinski, Jr.
Attorney, Agent, or Firm—Thompson, Birch, Gauthier & Samuels

[57] ABSTRACT

An air control device regulates the amount of air flowing through an air passage bypassing a throttle valve place in an induction passage leading to an engine for an automotive vehicle so that the air flow can increase during warming up of the engine. A shutter mechanism for regulating the effective area for the air flow through the air passage is cylindrical, for example, including an inner cylindrical body and an outer cylindrical body which are rotatable to each other.

12 Claims, 7 Drawing Figures

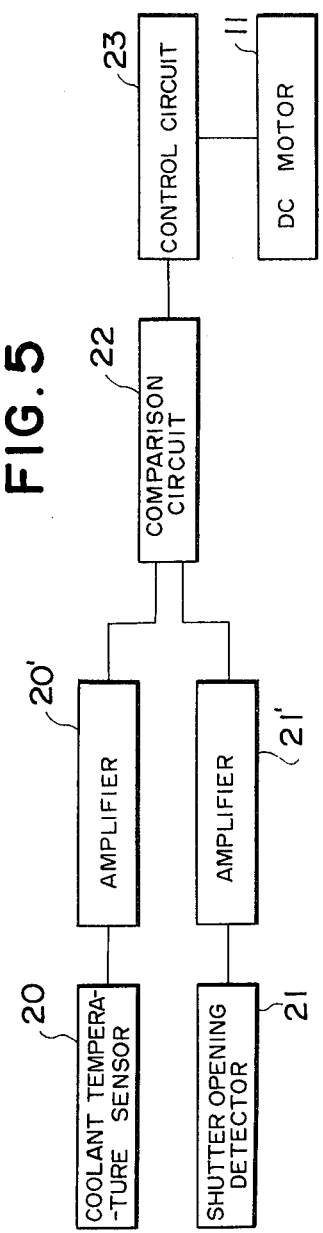
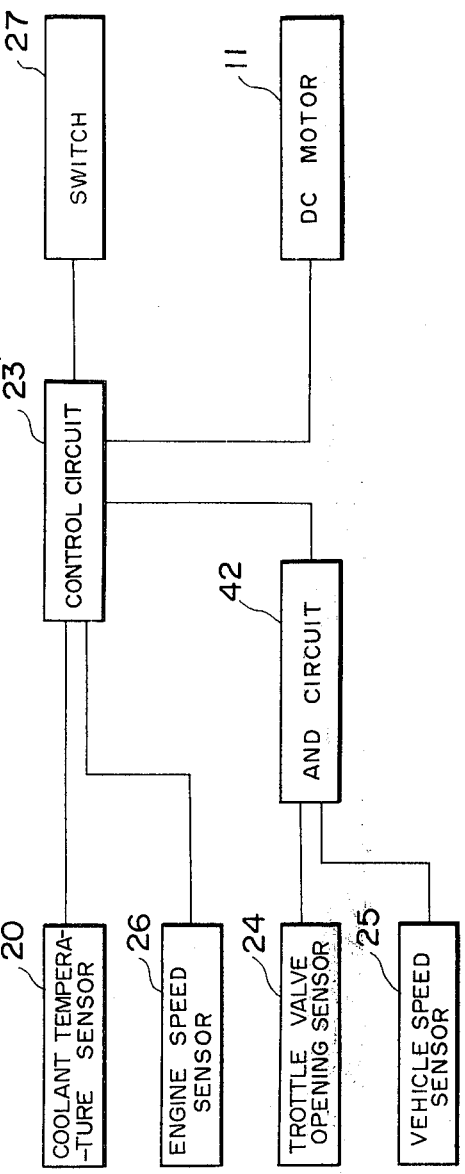

AIR CONTROL DEVICE

BACKGROUND OF THE INVENTION

This invention relates to an air control device for regulating the amount of air flowing through an air passage bypassing a throttle valve during engine warming-up.

In an eleair passage for the air flow is controlled to increase the air flow rate so that the engine speed can increase thereby to advance engine warming-up.

FIG. 1 shows a conventional mechanism for controlling the effective area for the air flow through the air bypassing passage. An air passage A has a passage inlet A' leading to the upstream side of a throttle valve (not shown) and a pahas a slit C formed vertically therein so that the rotation of the shutter B controls the air flow in cooperation with the wall of the air passage A. A bimetallic element E is actuated in response to engine temperature so as to rotate the shutter B in a given direction.

In such a conventional structure, the shutter B is pulled by the vacuum in the outlet A" so that the friction between the shutter B and a sliding portion F of the wall of the air passage A increases. In particular, when the vacuum in the passage outlet A" is strong, the shutter B can not rotate smoothly due to the friction between the shutter B and the sliding portion F. If the closing force of the bimetallic element E is increased to compensate for this frictional resistance, then when engine speed is decreased with an accompanying decrease of vacuum and frictional resistance, the shutter B will have a tendency to snap shut, making it difficult to achieve precise control of air flow.

SUMMARY OF THE INVENTION

It is an object of the present invention to provide a device for controlling precisely the air flowing through an air passage bypassing a throttle valve between the downstream and the upstream sides thereof.

A further object of the present invention is to provide an air control device in which the air flow can be properly controlled regardless of the degree of the vacuum produced in the downstream side of the throttle valve so that air control can be maintained precisely even when downstream.

According to this invention, an air control device regulates the amount of air flowing through an air passage bypassing a throttle valve place in an induction passage leading to an engine for an automotive vehicle so that the air flow can increase during warming up of the engine. A shutter mechanism for regulating the effective area for the air flow through the air passage is cylindrical, for example, including an inner cylindrical body and an outer cylindrical body which are rotatable in relation to each other. It is preferable that the outer cylindrical body is fixed relative to the main body, and that the inner cylindrical body is rotatably fitted in the outer cylindrical body. The inner and outer cylindrical bodies lindrical body thereby to regulate the effective area for the air flow through the through holes of the inner and outer cylindrical bodies. Such an actuating mechanism may be a DC motor, pulse motor, bimetallic device, or the like.

BRIEF DESCRIPTION OF THE DRAWINGS

These and other objects, features and advantages of the present invention will become more apparent from the following description of preferred embodiments thereof when taken in conjunction with the accompanying drawings in which:

FIG. 5 is a block diagram showing an electric circuit for controlling the DC motor shown in FIG. 2;

FIG. 6 is a block diagram showing another electric circuit for controlling the DC motor shown in FIG. 2.

DETAILED DESCRIPTION OF THE PREFERRED EMBODIMENTS

Figure 1:
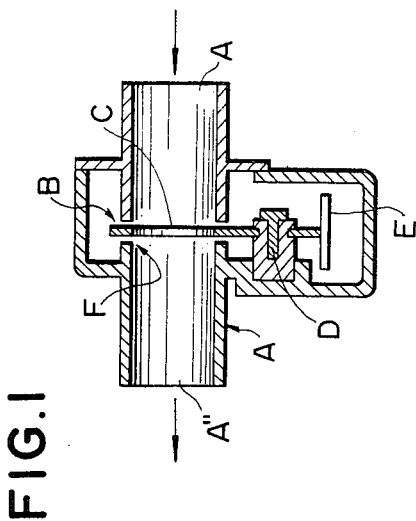
FIG. 1 is a schematic sectional view showing a conventional device for controlling the flow of air through an air passage bypassing a throttle valve provided in an intake passage leading to an engine.
Figure 2:
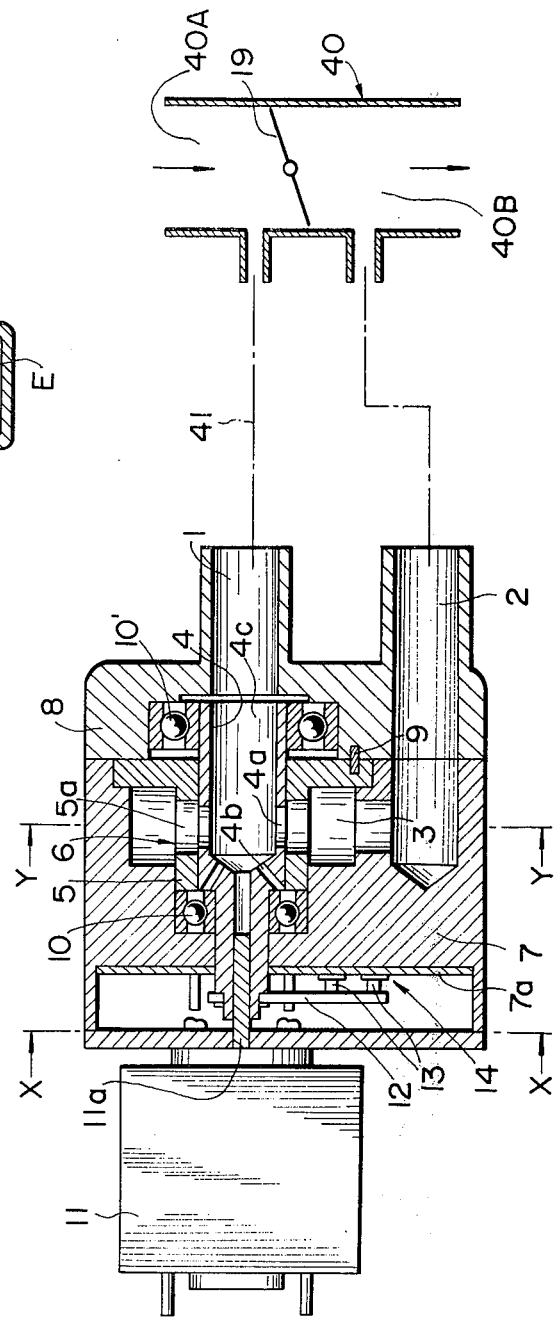
FIG. 2 is a sectional view showing a device for controlling the air flow according to an embodiment of the present invention.

Referring now to FIG. 2, a throttle valve 19 is provided in a main induction passage 40 in a well known manner. An air control device according to a preferred embodiment of the present invention is positioned in an air passage 41 bypassing the throttle valve 19 so as to connect the upstream side 40A of the throttle valve 19 with the downstream side 40B thereof. A main body 7 of the air control device is provided with a cover 8 having a passage inlet 1 and a passage outlet 2 in parallel. The main body 7 has a connection passage 3 for connecting the passage inlet 1 with the passage outlet 2. The main body 7 is provided with a cylindrical shutter 6 consisting mainly of an inner cylindrical body 4 and an outer cylindrical body 5. The inner cylindrical body 4 is inserted into the outer cylindrical body 5 which is fitted in the main body 7. The outer cylindrical body 5 is fixed in position into the main body 7 by means of the cover 8 and a positioning pin 9. The inner cylindrical body 4 is rotatable within the outer cylindrical body 5. The inner cylindrical body 4 has in its longitudinal direction a relatively long hole 4c with substantially the same diameter as that of the passage inlet 1. The hole 4c of the inner cylindrical body 4 is cylindrical body 4 is rotatably supported by the cover 8 through a bearing 10'. A through hole 4a is formed in the inner cylindrical body 4 so as to connect the outside thereof with the inner hole or space 4c. A through hole 5a is vertically formed in the outer cylindrical body 5, corresponding to the through hole 4a of the inner cylindrical body 4. Thus, the rotation of the inner cylindrical body 4 relative to the outer cylindrical body 5 controls the effective area in the air passage between the passage inlet 1 and the connection passage 3. When the through hole 4 of the inner cylindrical body 4 is completely aligned with the through hole 5a of the outer cylindrical body 5, the effective area of the air passage therebetween becomes the maximum.

A DC motor 11 is fixed to the main body 7 by means of a screw or the like. The driving shaft 11a of the DC motor 11 is connected to the front portion of the inner cylindrical body 4 in such a way that the cylindrical body 4 can be rotated by the DC motor 11. The air flow between the passage inlet 1 and the connection passage 3 is controlled according to the rotation angle of the driving shaft 11a of the DC motor 11.

Figure 3:
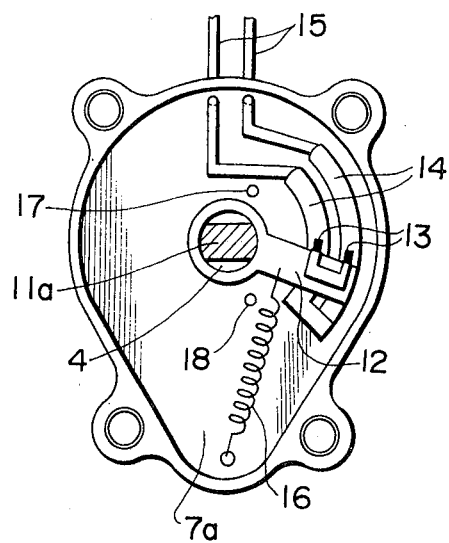
FIG. 3 is a sectional view taken on the line X—X in FIG. 2.

A lever 12 is fixed at its one end portion to the front end of the inner cylindrical body 4, extending downwardly along the backside of the main body 7. A pair of brushes 13 are provided on the tip portion of the lever 12. The brushes 13 contact slidably a pair of resistance elements 14 which are, for example, formed in an arc shape and arranged in parallel as shown in FIG. 3. The resistance elements 14 are fixed on a member 7a secured to the backside of the main body 7. The rotation angle of the inner cylindrical body 4 corresponds to the opening degree of the shutter 6. The relative positions of the brushes 13 to the resistance elements 14 can change according thereto. The resistance elements 14 are connected through lead wires 15 to an electric circuit (not shown) for detecting the opening degree of the shutter 6.

The lever 12 is biased by a spring 16 in such a direction to close it as shown in FIG. 3. A pair of stops 17 and 18 are placed at such positions that the lever 12 is completely opened and closed, respectively. The lever 12 is rotatable between the "opened" stop 17 and the "closed" stop 18.

Figure 4:
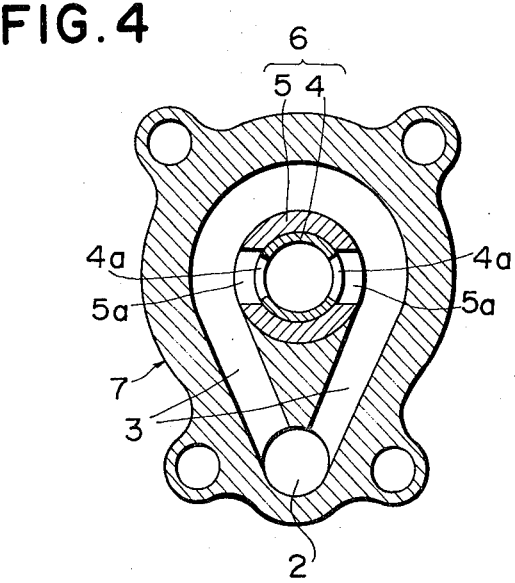
FIG. 4 is a sectional view taken on the line Y—Y in FIG. 2.

FIG. 4 shows a condition in which the hole 4a of the inner cylindrical body 4 is aligned with the hole 5a of the outer cylindrical body 5 so that the effective area for the air flow becomes the maximum. When the inner cylindrical body 4 rotates at a right angle from the position shown in FIG. 4, the effective area for the air flow becomes the minimum.

As the shutter 6 is a combination of the inner and outer cylindrical bodies 4 and 5, the vacuum in the downstream 40B of the throttle valve 19 has substantially no effect on the operation of the shutter 6, that is, the rotation of the inner cylindrical body 4 in the outer cylindrical body 5. Consequently, the shutter 6 can smoothly operate even if the vacuum downstream of the throttle valve 19 is strong. It is preferable in order to avoid perfectly the vacuum effect on the shutter 6 that a small hole 4b is formed in the inner cylindrical body 4 so as to connect the inner hole or space 5c of the inner cylindrical body 4 with a space or clearance in the bearing 10.

FIG. 5 shows by way of an example an electric circuit for controlling the DC motor 11 of actuating the inner cylindrical body 4. A coolant temperature sensor 20 detects the coolant temperature and sends a temperature signal through an amplifier 20' to a comparison circuit 22. A shutter opening detector 21 detects a rotation angle of the inner cylindrical body 4 and sends an opening signal through an amplifier 21' to the comparison circuit 22. The comparison circuit 22 compares the temperature signal and the opening signal to send a comparison signal to a control circuit 23. Upon receipt of the comparison signal from the comparison circuit 22, the control circuit 23 regulates the voltage to be applied to the DC motor 11, for example, by a known ON-OFF duty control, so that the rotation angle of the driving shaft 11a can be precisely controlled.

The coolant temperature sensor 20 is one which can detect the warming-up conditions of the engine. The shutter opening sensor 21 can be composed of a potentiometer which can be a combination of the brushes 13 and the resistance elements 14 as shown in FIG. 2.

FIG. 6 shows another example of the control circuit for the DC motor 11. The temperature signals are sent from the coolant temperature sensor 20 to the control circuit 23' so as to show the warming up conditions of the engine. Idling of the engine is detected on the basis of signals from a vehicle speed sensor 25 and a throttle valve opening sensor 24 by an AND circuit 42 so as to send an idling signal to the control circuit 23'. An engine speed sensor 26 detects the actual speed of the engine and sends an engine speed signal to the control circuit 23'. Also, a signal in respect of the cooler operation conditions is sent from a cooler switch 17 to the control circuit 23'. The control circuit 23' compares those signals thereby to regulate the voltage applied to the DC motor 11 so that the rotation angle of the driving shaft 11a can be precisely controlled. In this example, the idling adjustment can be obtained by taking into consideration the cooler conditions in addition to the control of the air flow, that is, the actual engine speeds, during warming-up of the engine. Thus, the precision and responsibility of the control can be remarkably improved.

A microcomputer is preferably used as the control circuit 23' from the viewpoint of its wide applicability although an analogous one can be used.

A pulse motor can be used in place of the DC motor 11. The driving force can be transmitted through a gear device to the inner cylindrical body 4 from the DC motor 11 so that the DC motor 11 can be designed small in size with a low torque.

Figure 7:
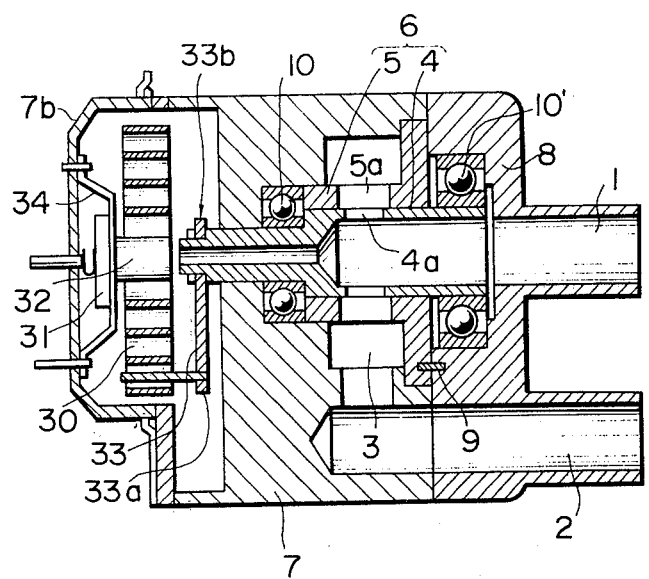
FIG. 7 is a sectional view showing another embodiment of the present invention.

FIG. 7 shows a further embodiment of the present invention. In place of the DC motor 11, a bimetallic element 30 is employed for the purpose of rotating the inner cylindrical body 4. A heater 31 is fixed to a member 7b secured on the back portion of the main body 7, by means of a bracket 34. Also, a shaft 31 is fixed to the bracket 34, supporting the central portion of the bimetallic element 30 which is of a spiral form. The outer end of the bimetallic element 30 is joined to the tip 33a of the lever 33 the base portion 33b of which is fixed to the front end of the inner cylindrical body 4. When the heater 31 heats during the warming-up of the engine, the outer end of the heater 31 controls the opening degree of the shutter 6 so that the construction thereof can be simple with its low cost of the production thereof. In addition, if the spiral bimetallic element 30 is used, the rotation angle of the lever 33 can be set with high precision.

Except for the mechanism for actuating the inner cylindrical body 4, the same construction can be employed commonly in the first and second embodiments as shown in FIGS. 2 and 7, respectively, in which like references designate identical parts or elements.

In another aspect of the present invention, the air coming through the passage inlet 1 from the upstream side of the throttle valve 13 can be introduced from the outside of an inner cylindrical body to the inside thereof near a shutter, although in the embodiments as above-stated the air is introduced from the inside of the inner cylindrical body 4 to the outside thereof.

Except for the mechanism for actuating the inner cylindrical body 4, the same construction can be employed commonly in the first and second embodiments as shown in FIGS. 2 and 7, respectively, in which like references designate identical parts or elements.

In another aspect of the present invention, the air coming through the passage inlet 1 from the upstream side of the throttle valve 13 can be introduced from the outside of an inner cylindrical body to the inside thereof near a shutter, although in the embodiments as above-stated the air is introduced from the inside of the inner cylindrical body 4 to the outside thereof.

What is claimed is:

1. An air control device for regulating the air flow, comprising:

an induction passage;

a throttle valve placed in the induction passage;

an air passage bypassing the throttle valve so that the air flow through the bypassing air passage can increase during engine warm-up;

a main body having a portion of said air bypassing passage extending therethrough, one end of said air bypassing passage being connected to the induction passage on the upstream side of the throttle valve and the other end of said air bypassing passage being connected to the induction passage on the downstream side of the throttle valve;

a shutter mechanism contained within said main body for rotatably regulating the air flow through said air bypassing passage, said shutter mechanism being provided with a fixed cylindrical means and a rotatable cylindrical means having communicating axial and transverse holes so as to define the effective area of the air flow; and a mechanism for rotatably actuating said shutter mechanism to regulate the effective area of one of said holes.

2. An air control device for regulating the air flow through an air passage bypassing a throttle valve placed in an induction passage leading to an engine so that the air flow through the bypassing air passage can increase during engine warm-up, said air control device including:

a main body having a portion of said bypassing air passage extending therethrough, opposite ends of said bypassing air passageway being connected respectively to said induction passage at upstream and downstream sides of said throttle valve, a shutter mechanism for regulating air flow through said bypassing air passage; and a mechanism for actuating the shutter mechanism in a way such that the effective area for the air flow within the bypassing air passage can be regulated by the shutter mechanism, the shutter mechanism including the combination of an inner cylindrical body and an outer cylindrical body, the outer cylindrical body being contained within and fixed relative to the main body, and the inner cylindrical body being contained within and being rotatable relative to the outer cylindrical body, the actuating mechanism being so formed as to rotate the inner cylindrical body relative to the outer cylindrical body thereby to regulate the effective area for air flow therethrough.

3. The air control mechanism of claim 2, wherein the outer cylindrical body has an axially extending first cylindrical space and a first transverse through hole for connecting the first cylindrical space with the outside thereof, and wherein the inner cylindrical body is rotatably fitted within the first cylindrical space of the outer cylindrical body, and the inner cylindrical body has an axially extending second cylindrical space which is in constant communication with the induction passage on the upstream side of the throttle valve, and the inner cylindrical body also has a second transverse through hole so formed therein as to cooperate with the first through hole of the outer cylindrical body to regulate the effective area available for air flow from the second cylindrical space of the inner cylindrical body to the outside of the outer cylindrical body the outside of the outer cylindrical body being in constant communication with said induction passage on the downstream side of the throttle valve.

4. The air control device of claim 3, wherein the actuating mechanism is a DC motor.

5. The air control device of claim 4, wherein the DC motor is controlled on the basis of a signal representing the temperature of an engine coolant and a signal representing a rotation angle of the inner cylindrical body.

6. The air control device of claim 4, wherein the DC motor is controlled on the basis of a signal representing a coolant temperature, a signal representing engine speed, a signal representing an opening degree of the throttle valve and a signal representing vehicle speed.

7. The air control device of claim 3, wherein the actuating mechanism is a pulse motor.

8. The air control device of claim 3, wherein the actuating mechanism is a bimetallic element.

9. The air control device of claim 3, wherein the main body includes a cover for fixing the outer cylindrical body within the main body.

10. The air control device of claim 9, wherein the bypassing air passage includes a passage inlet and a passage outlet formed in the cover, and a connecting passage formed in the main body for connecting the passage inlet with the passage outlet by way of the first and second through holes of the outer and inner cylindrical bodies.

11. An air control device for regulating the flow of air through a bypass air passageway leading from the upstream side to the downstream side of an engine throttle valve, said air control device comprising: an outer cylindrical body containing an inner rotatable cylindrical body, the interior of said inner cylindrical body being in constant communication via one section of the said bypass air passageway with one side of said engine throttle valve, said outer cylindrical body having a first transverse hole in constant communication via another section of said bypass air passageway with the other side of said throttle valve, a second transverse hole in said inner cylindrical body leading from the interior thereof to the interface between said inner and outer cylindrical bodies, and means for rotatably adjusting the position of said inner cylindrical body relative to that of said outer cylindrical body so as to vary the degree of alignment between said first and second transverse holes.

12. For use with a throttle valve arranged in an air induction passage leading to an engine, an air bypass control device comprising:

a main body having an air bypass passage extending therethrough, said bypass passage having inlet and outlet ends which are arranged in parallel and connected respectively to said induction passage at the upstream and downstream sides of said throttle valve;

a shutter mechanism for rotatably regulating air flow through said bypass passage, said shutter mechanism having a pair of relatively rotatable cylindrical components defining an axially extending passage communicating with one portion of said bypass passage and a transverse passage connecting said axially extending passage to another portion of said bypass passage the effective area of the transverse passage being defined in proportion to the relative rotation of the cylindrical components; and a mechanism for rotatably adjusting one of said cylindrical components relative to the other of said cylindrical components in order to vary the effective area of said transverse passage available for air flow therethrough.

* * * * *